April 24, 1928.
E. J. WIGGINS
CONDENSER
Filed Aug. 9, 1923
1,666,922
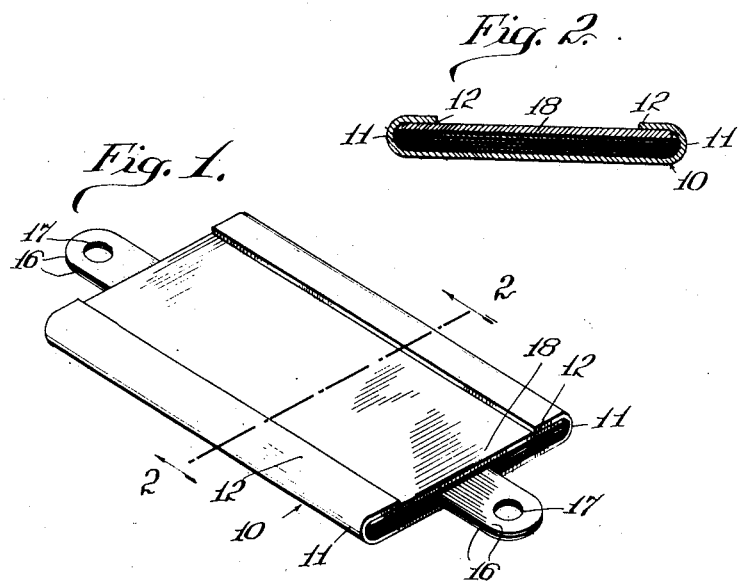
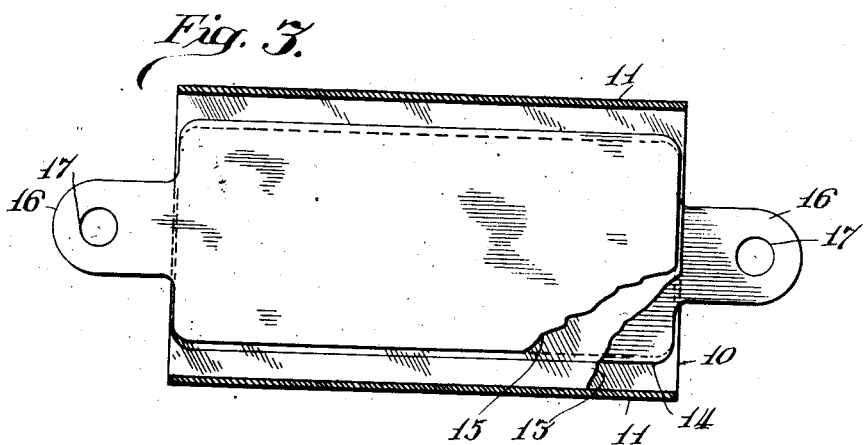
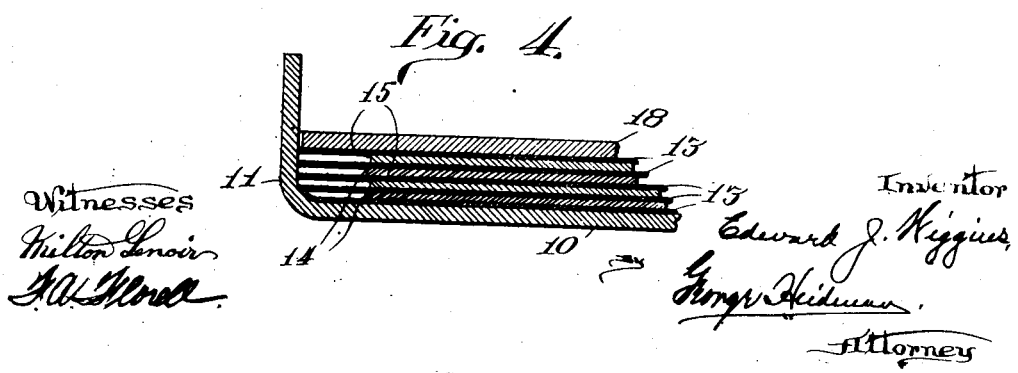

Patented Apr. 24, 1928.

1,666,922

UNITED STATES PATENT OFFICE.

EDWARD J. WIGGINS, OF CHICAGO, ILLINOIS, ASSIGNOR, BY MESNE ASSIGNMENTS, TO ELECTRICAL RESEARCH LABORATORIES, INC., OF CHICAGO, ILLINOIS, A CORPORATION OF DELAWARE.

CONDENSER.

Application filed August 9, 1923. Serial No. 656,586.

My invention relates to an electrical condenser more especially adapted for use in radio apparatus; the invention having for its object the provision of a condenser of predetermined fixed capacity and which will be simple in construction and not readily injured or affected.

The advantages of my invention will be more readily comprehended from the detail description of the drawing, wherein:—

Figure 1 is a perspective view.

Figure 2 is a cross sectional view taken on the line 2—2 of Figure 1 looking in the direction of the arrows.

Figure 3 is a sectional plan view with portions broken away.

Figure 4 is an enlarged detail sectional view of a portion of the condenser, showing manner of assembly.

The invention, in the particular exemplification, disclosed in the drawing, consists of a supporting plate or shell 10 of suitable sheet metal initially provided with upstanding sides 11 of suitable height commensurate with the size of condenser, to permit the sides to be bent inwardly across the various elements of the condenser, as shown at 12, 12 in Figures 1 and 2. The supporting plate or shell is preferably shown rectangular in form and is intended to receive a suitable sheet of dielectric material such as mica, as at 13, see Figure 4, extending throughout the length and width of the base portion of the supporting plate or shell 10.

Superposed on the dielectric 13, and in alternate relation, are suitable metallic plates or conductor elements 14, 14 and 15, 15, with intervening dielectric material or sheets of mica 13, as more clearly shown in Figure 4.

The conductor plates 14 and 15 are shown similar in construction and each provided with an extended lobe or ear as at 16; the lobes or extensions of the plates 14 being disposed beyond the same end of the supporting plate 10, while the lobes or ears 16 of the plates 15 extend beyond the opposite end of the plate 10; the plates 14 and 15 being of suitable high conducting material such as thin sheets of copper or brass; and the extensions or lobes 16 are apertured as at 17 to receive the lead lines or wires.

The conductor plates 14 and 15 of suitable high conducting material are preferably previously coated with a thin film of wax suitably applied, as by dipping the plates in the hot solution, so as to leave a comparatively thin film on the surfaces of the plates.

After the elements thus far described have been properly assembled on the shell or supporting plate 10, with the lobes or extensions of the alternate plates extending beyond the ends of the shell or plate 10 as described, I prefer to place a comparatively rigid sheet metal plate 18 on top of the uppermost dielectric 13.

After the various elements have been assembled as just described, the upstanding sides 11 of the shell or supporting plate 10 are then bent and subjected to pressure, by means of a suitable press, in order that the heavy metal may be bent over and onto the rigid non-flexing plate 18 and thereby subject the various elements, through rigid plate 18, to a uniform pressure throughout, to regulate or determine the capacity of the condenser.

The capacity of the condenser is not only determined by the number of conductor plates 14 and 15, but is also determined by the thickness of the dielectric used and the degree of pressure applied through the bending of the upstanding sides 11 over and onto the upper side of the condenser as shown at 12 in Figures 1 and 2. The shell or supporting plate 10 is made of heavy material sufficient to provide a rigid shell and at the same time enable the bent sides 12 to remain in the bent condition desired and therefore to retain the pressure-applying relation with the superposed elements as shown in Figures 1 and 2. It is also evident that by placing the comparatively heavy sheet metal plate 18 on top of the various elements of the condenser, the pressure induced by the bent sides 12 will be distributed throughout the various conductor plates and dielectric and buckling of the thin metal conductor plates and dielectric along the longitudinal center line of the condenser will be prevented.

In the formation of my improved condenser, namely while pressure is being applied to the bent side flanges 12, the condenser is also preferably heated by electricity, in order that the thin film or coating of wax on the conductor plates will yield to the pressure and flow with uniformity and consistency so as to ooze out about the edges of the conductor plates and provide a coating about the edges of the condenser which will prevent moisture entering between the superposed elements.

With my improved construction, the capacity of the condenser may be accurately determined and tested by the manufacturer and the predetermined capacity maintained; it being understood, of course, that the capacity of the condenser may be varied not only by the number of conductor plates employed and the permanent pressure maintained, but also by the thickness of the dielectric used. That is to say, by decreasing the thickness of the dielectric, the capacity may be increased; increasing the area of the conductor plates will also increase the capacity, while bending and pressing the side flanges 12 into firmer or closer contact with the pressure distributing plate 18 will also increase the capacity of the condenser, as such pressure will cause the conductor plates to be forced into closer contact with the mica and therefore into closer relation with each other. On the other hand, positioning of the side flanges 12 so as to apply less pressure on top of the plate 18 will have the same effect as increasing the thickness of the dielectric and therefore will decrease the capacity of the condenser.

I prefer to employ a substance or wax of high melting point, for coating the conductor plates, in order that climatic conditions or temperatures will not affect the condenser. By heating the condenser as stated, while subjecting it to pressure during the formation thereof to determine the permanent pressure applying relation of the side flanges to the superposed plates, the coating of wax on the respective plates is made uniform and at the same time the wax coating reduced in thickness and a thinner dielectric therefore also provided and the capacity consequently increased.

By the use of suitable instruments during the operation of heating and bending, the exact capacity of the condenser may be determined and obtained and the desired capacity maintained by reason of the fixed pressure produced by the rigid bent side flanges 12 remaining in permanent position; with the result that a condenser of a fixed tested capacity may be produced.

I have shown what I believe to be the simplest embodiment of my improved condenser and method of producing same, having described the same in terms employed merely as terms of description and not as terms of limitation, as structural modifications are possible and may be made without, however, departing from the spirit of my invention.

What I claim is:—

1. A condenser of the character described, comprising a plurality of thin sheet metal conductor plates, provided with terminal receiving ends, with the terminal of each alternate plate disposed beyond the same end of the condenser, said plates being separated by sheets of dielectric material and a sheet of dielectric material being disposed above and below the superposed elements, a non-flexible metallic plate superposed on the uppermost sheet of dielectric material, a supporting metallic plate on which the conductor plates and dielectric material are superposed, said supporting plate being of greater width than the conductor plates and sheets of dielectric material, with both longitudinal sides of said supporting plate being bent upwardly and over onto the superposed elements into pressure applying relation with said non-flexible metallic plate whereby uniform pressure is applied throughout the superposed conductor plates and dielectric material, and a thin coating of moisture resisting material on the conductor plates and at the ends of the condenser.

2. The herein described method of forming a condenser, which consists in providing the metallic plates of conducting material with a thin coating of moisture resisting material having a comparatively high melting point, superposing in alternate relation the conductor plates and intervening sheets of dielectric material on a rigid metallic supporting plate, bending the sides of said rigid metallic plate upward across the top of the superposed elements into pressure applying relation therewith, and electrically heating the superposed elements while bending said sides of the supporting plate into pressure applying position, subjecting the condenser to a predetermined degree of pressure to cause the moisture resisting material to flow about the exposed ends of the superposed elements.

EDWARD J. WIGGINS.